US012798665B2

(12) United States Patent
Min

(10) Patent No.: US 12,798,665 B2
(45) Date of Patent: Nov. 17, 2026

(54) ELECTRIC STEERING APPARATUS HAVING LOAD DETECTION FUNCTION

(71) Applicant: INDUSTRY-ACADEMY COOPERATION FOUNDATION, HALLA UNIVERSITY, Wonju-si (KR)

(72) Inventor: Young Jae Min, Hwaseong-si (KR)

(73) Assignee: Industry-Academy Cooperation Foundation, Halla University, Wonju-si (KR)

( * ) Notice: Subject to any disclaimer, the term of this patent is extended or adjusted under 35 U.S.C. 154(b) by 0 days.

(21) Appl. No.: 19/129,263

(22) PCT Filed: Nov. 24, 2022

(86) PCT No.: PCT/KR2022/018728

§ 371 (c)(1),
(2) Date: May 12, 2025

(87) PCT Pub. No.: WO2024/111706

PCT Pub. Date: May 30, 2024

(65) Prior Publication Data

US 2026/0167258 A1 Jun. 18, 2026

(30) Foreign Application Priority Data

Nov. 23, 2022 (KR) ........................ 10-2022-0158237

(51) Int. Cl.
*B62D 5/04* (2006.01)
*B62D 6/00* (2006.01)

(52) U.S. Cl.
CPC ............. *B62D 5/0463* (2013.01); *B62D 6/00* (2013.01)

(58) Field of Classification Search
CPC ............. B60W 40/13; B60W 2300/12; B60W 2300/123; B60W 2300/125;
(Continued)

(56) References Cited

U.S. PATENT DOCUMENTS 5,668,722 A * 9/1997 Kaufmann ........... B62D 5/0466 701/41
7,508,148 B2 * 3/2009 Kanda .................... B62D 6/008 318/432
(Continued)

FOREIGN PATENT DOCUMENTS

CN 111137352 A 5/2020
JP 2004098841 A * 4/2004
(Continued)

OTHER PUBLICATIONS

Kimura, JP 2004-098841, machine translation. (Year: 2004).*

*Primary Examiner* — Mark L. Greene
(74) *Attorney, Agent, or Firm* — You & IP, LLC

(57) ABSTRACT

The present invention relates to an electric steering device having a vehicle load detection function, which detects a vehicle load using a vehicle speed and a handwheel torque detected from a handwheel sensor included in an electric steering device and a motor current detected from an electric steering motor, and outputs a driving signal for controlling the motor current applied to the electric steering motor. Since the present invention does not use a separate vehicle load detection sensor device, it is possible to solve both a problem of having to secure a physically separate external space to install a conventional vehicle load detection sensor device when a vehicle steering device is implemented and a problem of causing a direct increase in the cost of the steering device due to the installation of the sensor device.

9 Claims, 6 Drawing Sheets

(58) Field of Classification Search
CPC . B60W 2530/10; B62D 5/046; B62D 5/0463; B62D 6/00
See application file for complete search history.

(56) References Cited

U.S. PATENT DOCUMENTS

| | | | | |
|---|---|---|---|---|
| 9,037,351 | B2 * | 5/2015 | Yabuguchi | B62D 5/0493 180/404 |
| 2019/0031231 | A1 | 1/2019 | George | |

FOREIGN PATENT DOCUMENTS

| | | | |
|---|---|---|---|
| KR | 10-2015-0065421 | A | 6/2015 |
| KR | 10-1661065 | B1 | 9/2016 |
| KR | 10-2017-0059112 | A | 5/2017 |
| KR | 10-2022-0064013 | A | 5/2022 |

* cited by examiner

ELECTRIC STEERING APPARATUS HAVING LOAD DETECTION FUNCTION

TECHNICAL FIELD

The present invention relates to an electric steering device, and more particularly, to an electric steering device having a vehicle load detection function.

BACKGROUND ART

FIG. 1 shows a configuration of a motor control device of a conventional electric steering device for a vehicle disclosed in Patent Document 1 (KR10-2022-0064013 A).

The motor control device of the conventional electric steering device for a vehicle shown in FIG. 1 includes an output control module 20 that controls a motor current applied to a motor 40 of the electric steering device from a steering control module 10 of the electric steering device according to a load of the vehicle detected by a load detection unit 30.

In the motor control device of the conventional electric steering device for a vehicle configured as described above, particularly, the load detection unit 30 includes a vehicle height sensor that detects a height of the vehicle, and the output control module 20 calculates an error between a load detected by the vehicle height sensor of the load detection unit 30 and a preset reference value, and controls a motor current applied to the motor 40 according to a result of comparing the calculated error with the preset value, thereby ensuring steering performance and motor overheating protection.

However, in the motor control device of the conventional electric steering device for a vehicle published in the above-described patent document 1 (KR10-2022-0064013 A), there is a problem in that a difficulty of physically implementing the steering device increases because the vehicle height sensor for detecting the height of the vehicle included in the load detection unit 30 is installed in a separate physical space rather than inside the steering device.

In addition, there is a problem that the cost of the steering device directly increases because a separate vehicle height sensor that was not present previously is installed.

DETAILED DESCRIPTION OF INVENTION

Technical Problem

The present invention intends to solve the above-described conventional problems, and is directed to providing an electric steering device having a vehicle load detection function that detects a vehicle load using vehicle speed, a handwheel torque detected from a handwheel sensor included in the electric steering device, and a motor current detected from an electric steering motor, and outputs a driving signal for controlling the motor current applied to the electric steering motor.

Technical Solution

In order to achieve the purpose of the present invention, one aspect of the present invention provides an electric steering device having a vehicle load detection function including a handwheel sensor configured to detect a handwheel torque according to steering angle adjustment of a handwheel, an electric steering motor driven by a driving signal that controls a motor current to rotate the handwheel, and a steering controller configured to output the driving signal when the handwheel torque is detected.

In the electric steering device having a vehicle load detection function according to the present invention, the steering controller includes a preprocessing unit configured to receive a vehicle speed signal, a handwheel torque signal, and a motor current signal detected from the electric steering motor and filter them to extract significant signal components, a signal classification unit configured to classify the handwheel torque signal and the motor current signal extracted by the preprocessing unit to correspond to a pre-designated vehicle speed range, a torque/current calculation unit configured to calculate a handwheel torque value and a motor current value by integrating the handwheel torque signal and the motor current signal classified according to the vehicle speed range in the signal classification unit, a current/torque ratio calculation unit configured to calculate a current-to-torque ratio that represents a ratio of a force assisted by the electric steering motor to a total handwheel torque generated by the steering angle adjustment of the handwheel using the handwheel torque value and motor current value calculated by the torque/current calculation unit, a comparison unit configured to compare the current-to-torque ratio calculated by the current/torque ratio calculation unit with a tolerance ratio value of a corresponding vehicle that has been stored in advance to determine whether a vehicle load is increased or decreased, and a driving signal output control unit configured to output a driving signal for controlling a motor current applied to the electric steering motor according to whether the vehicle load is increased or decreased as obtained by the comparison unit.

In the electric steering device having a vehicle load detection function according to the present invention, the preprocessing unit may receive the vehicle speed signal through vehicle controller area network (CAN) communication.

In the electric steering device having a vehicle load detection function according to the present invention, the preprocessing unit may perform filtering to remove abnormal high-frequency noise components included in each of the vehicle speed signal, the handwheel torque signal, and the motor current signal and thus extract significant signal components.

In the electric steering device having a vehicle load detection function according to the present invention, the preprocessing unit may perform DC component filtering to remove an average value of signal components that do not contain significant information from the motor current signal and thus extract signal components that only contain the significant information from the motor current signal.

In the electric steering device having a vehicle load detection function according to the present invention, the torque/current calculation unit may distinguish valid sections from the handwheel torque signal and the motor current signal and perform an integration operation for each section to calculate a handwheel torque value for each section and a motor current value for each section.

In the electric steering device having a vehicle load detection function according to the present invention, the current/torque ratio calculation unit may calculate a current-to-torque ratio using an average value of the handwheel torque values for each section and the motor current values for each section, that is, an average value of the handwheel torque values for each section and an average value of the current values for each section obtained by distinguishing valid sections from the handwheel torque signal and the motor current signal in the torque/current calculation unit and performing an integration operation for each section.

In the electric steering device having a vehicle load detection function according to the present invention, the driving signal output control unit may output a driving signal that increases the motor current applied to the electric steering motor according to a vehicle load increase ratio when an increase in the vehicle load is determined by the comparison unit.

In the electric steering device having a vehicle load detection function according to the present invention, the driving signal output control unit may output a driving signal that reduces the motor current applied to the electric steering motor according to a vehicle load decrease ratio when a decrease in the vehicle load is determined by the comparison unit.

In the electric steering device having a vehicle load detection function according to the present invention, the driving signal output control unit may output a driving signal that adjusts the motor current applied to the electric steering motor to the same motor current immediately before the determination when the comparison unit determines that there is no change in an increase or decrease of the vehicle load.

Advantageous Effects

Since the present invention does not use a separate vehicle load detection sensor device, it is possible to solve both a problem of having to secure a physically separate external space to install a conventional vehicle load detection sensor device when a vehicle steering device is implemented and a problem of causing a direct increase in the cost of the steering device due to the installation of the sensor device, and in particular, since a driving signal for controlling a motor current applied to an electric steering motor is output based on a vehicle load detected using a vehicle speed, a handwheel torque, and the motor current of the electric steering motor, it is possible to expect effects of improving precise steering performance and preventing overheating of a motor.

MODES OF THE INVENTION

Hereinafter, embodiments of the present invention will be described in more detail with reference to the attached drawings.

An electric steering device having a vehicle load detection function according to the present invention described below is not limited to the following embodiments, and has a technical spirit to the extent that anyone with ordinary knowledge in the relevant technical field can modify and implement it without departing from the gist of the technology claimed in the claims.

Figure 1:
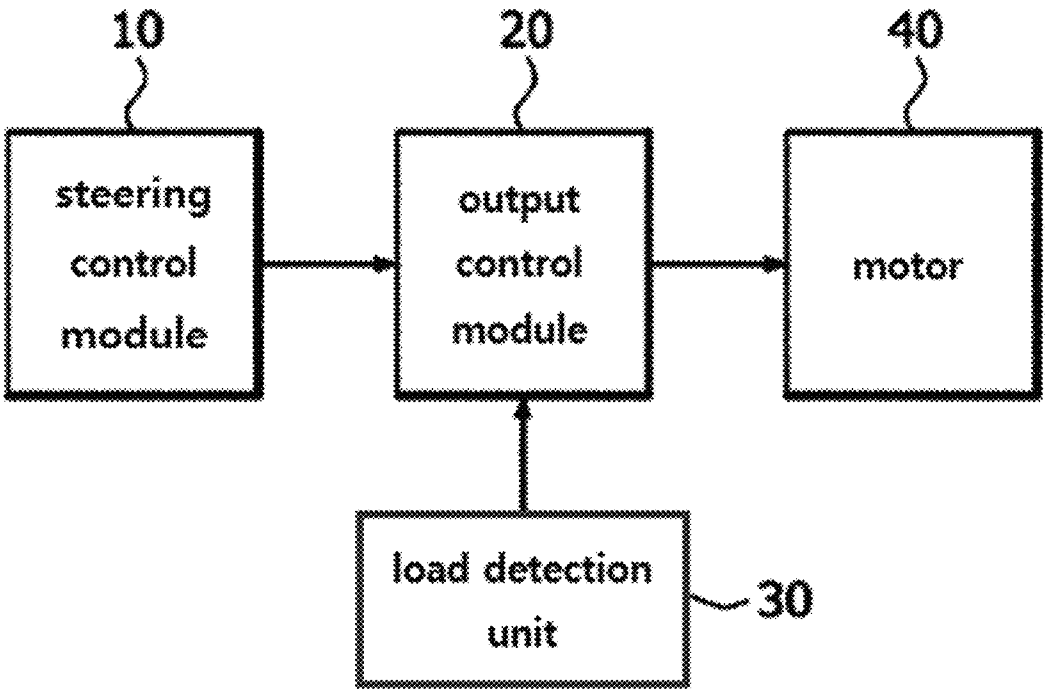
FIG. 1 (PRIOR ART)
FIG. 1 is a block diagram showing a configuration of a motor control device of a conventional electric steering device for a vehicle.
Figure 2:
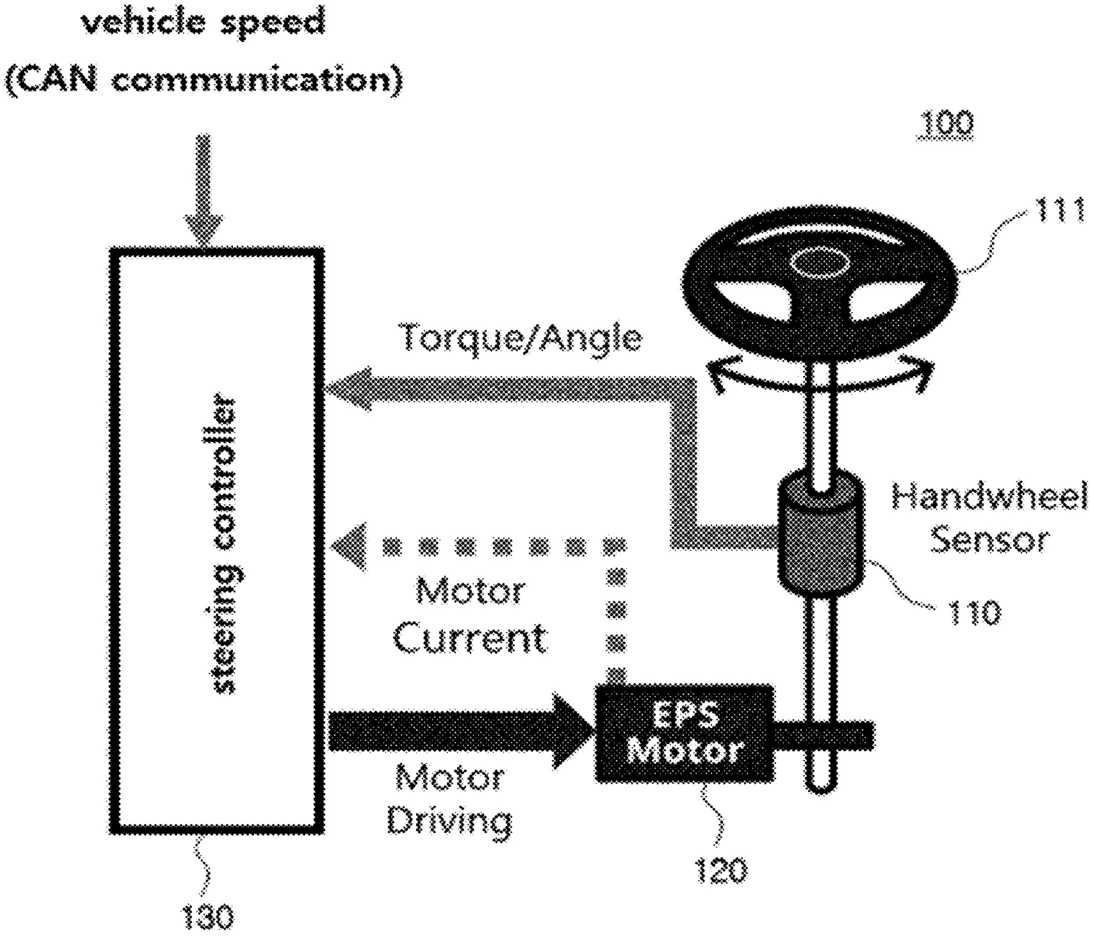
FIG. 2 is an embodiment showing a configuration of an electric steering device having a vehicle load detection function according to the present invention.
Figure 3:
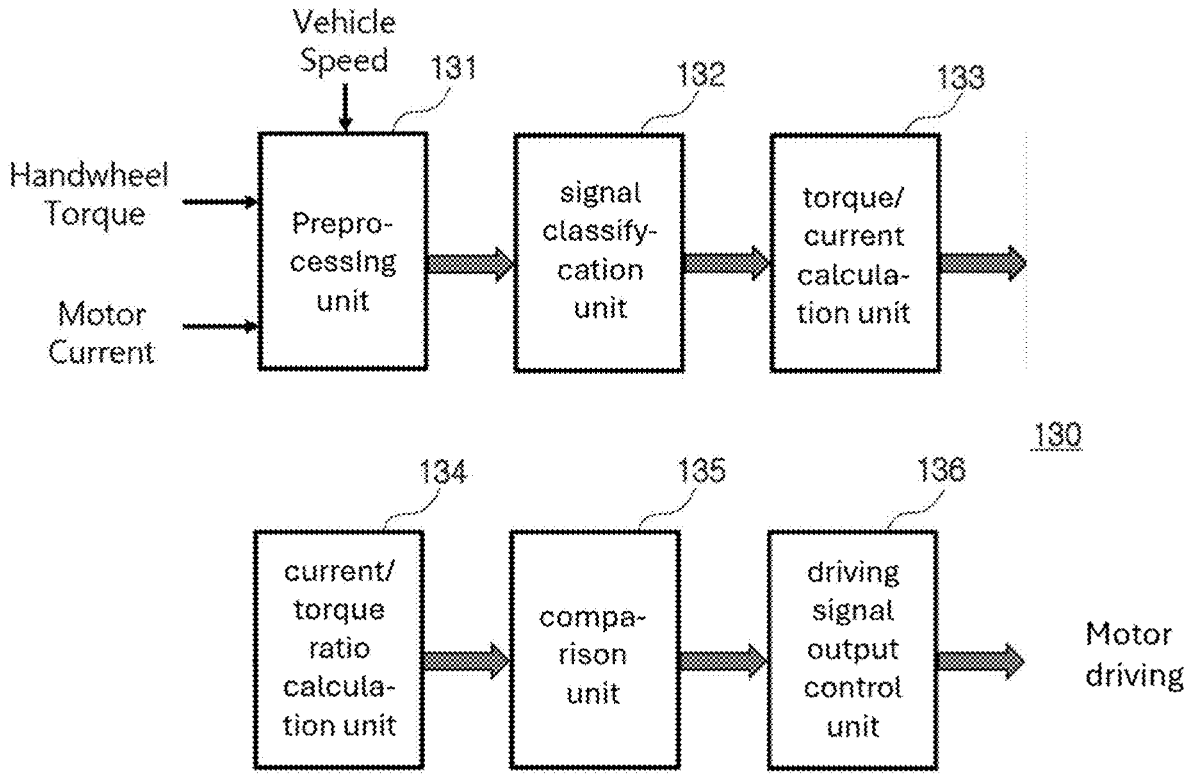
FIG. 3 is a block diagram showing a configuration of a steering controller shown in FIG. 2.

Referring to FIGS. 2 and 3, an electric steering device 100 having a vehicle load detection function according to the present invention includes a handwheel sensor 110, an electric steering motor 120, and a steering controller 130, and the steering controller 130 includes a preprocessing unit 131, a signal classification unit 132, a torque/current calculation unit 133, a current/torque ratio calculation unit 134, a comparison unit 135, and a driving signal output control unit 136.

The handwheel sensor 110 detects handwheel torque according to steering angle adjustment of a handwheel 111 and inputs the handwheel torque to the steering controller 130.

The electric steering motor 120 is driven by a driving signal output from the steering controller 130 to control a motor current, and rotates the handwheel 111.

When the handwheel torque is detected by the handwheel sensor 110, the steering controller 130 outputs the driving signal to drive the electric steering motor 120 and rotate the handwheel 111, thereby providing a force to assist a driver's steering operation.

The preprocessing unit 131 of the steering controller 130 receives a vehicle speed signal, a handwheel torque signal, and a motor current signal detected from the electric steering motor 120, filters each of the signals, and extracts significant signal components.

The preprocessing unit 131 receives the vehicle speed signal through vehicle controller area network (CAN) communication.

The signal classification unit 132 of the steering controller 130 classifies the handwheel torque signal and the motor current signal extracted by the preprocessing unit 131 to correspond to a pre-designated vehicle speed range.

The torque/current calculation unit 133 of the steering controller 130 calculates a handwheel torque value and a motor current value by integrating the handwheel torque signal and the motor current signal classified according to the vehicle speed range in the signal classification unit 132.

The current/torque ratio calculation unit 134 of the steering controller 130 calculates a current-to-torque ratio which represents a ratio of a force assisted by the electric steering motor 120 to the total handwheel torque generated by steering angle adjustment of the handwheel 111 using the handwheel torque value and motor current value calculated by the torque/current calculation unit 133.

The comparison unit 135 of the steering controller 130 compares the current-to-torque ratio calculated by the current/torque ratio calculation unit 134 with a tolerance ratio value of the corresponding vehicle that has been stored in advance to determine whether a vehicle load has increased or decreased.

The driving signal output control unit 136 of the steering controller 130 outputs a driving signal that controls the motor current applied to the electric steering motor 120 according to whether the vehicle load increases or decreases as obtained by the comparison unit 135.

The electric steering device 100 equipped with a vehicle load detection function according to the present invention configured as described above operates as follows.

In a vehicle equipped with the electric steering device 100 having the vehicle load detection function according to the present invention, the load of the vehicle increases or decreases according to whether a driver is the only one riding in the vehicle, whether additional people other than the driver are riding in the vehicle, or whether other items are loaded in addition to the people riding in the vehicle.

When the driver adjusts a steering angle of the handwheel 111 before or while driving in a state in which he/she is riding in the vehicle, the handwheel torque is detected by the handwheel sensor 110 and is input into the preprocessing unit 131 of the steering controller 130.

In this way, when the handwheel torque is detected by the handwheel sensor 110, the steering controller 130 outputs the driving signal to drive the electric steering motor 120 and rotates the handwheel 111, thereby providing the force to assist the driver's steering operation.

In this case, the vehicle speed signal, the handwheel torque signal, and the motor current signal detected from the electric steering motor 120 are input into the preprocessing unit 131.

Accordingly, the preprocessing unit 131 filters each of the vehicle speed signal, the handwheel torque signal, and the motor current signal detected from the electric steering motor 120 to extract significant signal components and transmit the signal components to the signal classification unit 132.

Figure 4:
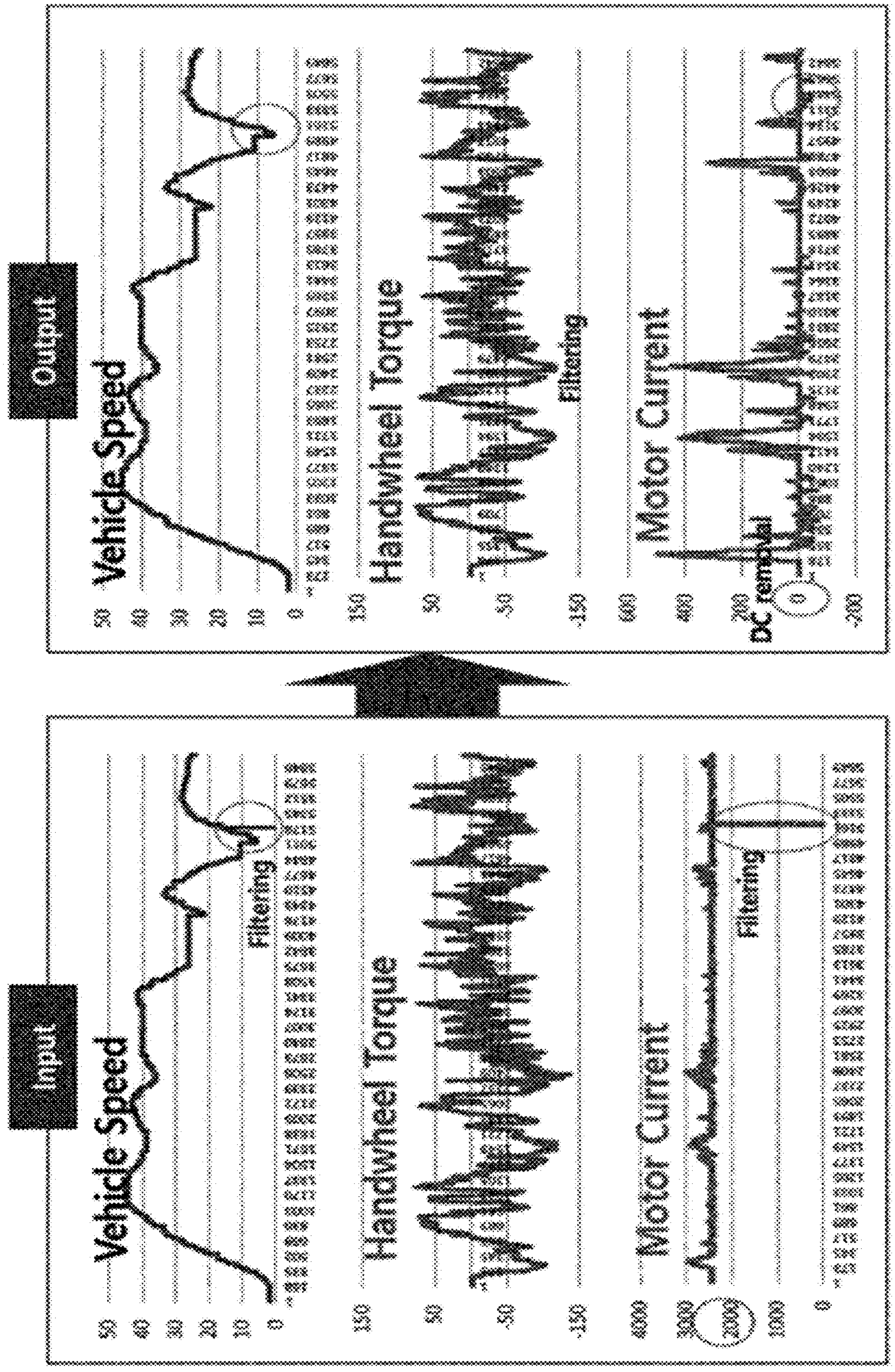
FIG. 4 is a graph explaining an operation of a preprocessing unit of FIG. 1.

For reference, FIG. 4 is a graph explaining the operation of the preprocessing unit 131.

As shown in FIG. 4, the preprocessing unit 131 performs filtering to remove abnormal high-frequency noise components included in each of the vehicle speed signal, the handwheel torque signal, and the motor current signal, thereby extracting the significant signal components.

In particular, as shown in FIG. 4, the preprocessing unit 131 performs DC component filtering to remove an average value of signal components that do not contain significant information from the motor current signal, thereby extracting signal components that only contain significant information from the motor current signal.

The vehicle speed signal, the handwheel torque signal, and the motor current signal extracted by the preprocessing unit 131 as described above are input into the signal classification unit 132, and among them, the handwheel torque signal and the motor current signal are classified to correspond to the pre-designated vehicle speed range.

Figure 5:
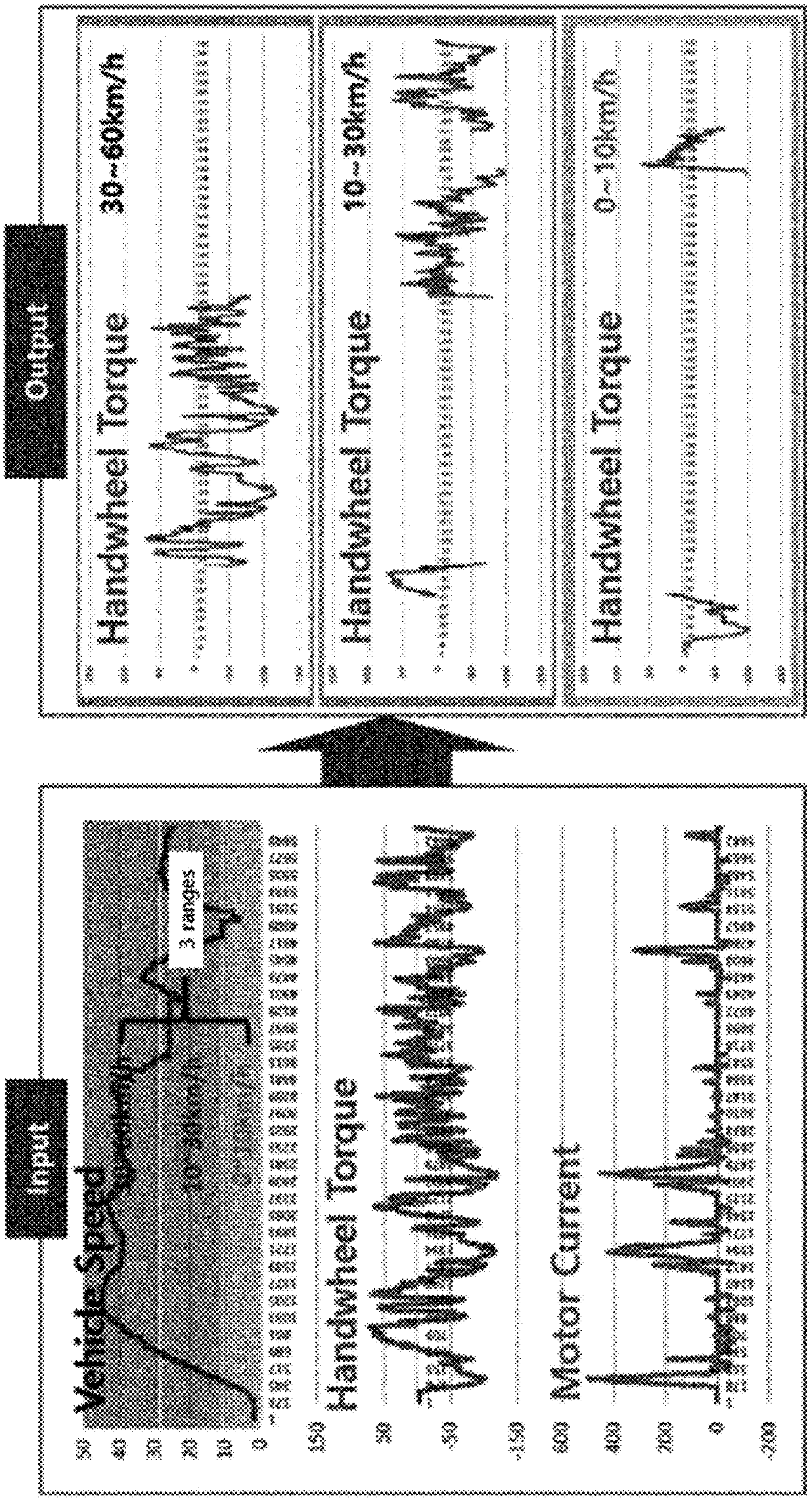
FIG. 5 is a graph explaining an operation of a signal classification unit of FIG. 1.

For reference, FIG. 5 is a graph explaining the operation of the signal classification unit 132, and exemplifies that the handwheel torque signal is classified to correspond to three vehicle speed ranges, such as 0 to 10 km/h, 10 to 30 km/h, and 30 to 60 km/h.

Although FIG. 5 does not exemplify that the motor current signal is classified to correspond to the three vehicle speed ranges, such as 0 to 10 km/h, 10 to 30 km/h, and 30 to 60 km/h, the motor current signal is classified in the same manner as the handwheel torque signal.

As described above, the handwheel torque signal and the motor current signal classified according to the vehicle speed range in the signal classification unit 132 are input into the torque/current calculation unit 133 and integrated to calculate the handwheel torque value and the motor current value.

In particular, in this case, the torque/current calculation unit 133 distinguishes valid sections in the handwheel torque signal and the motor current signal and performs an integration operation for each section to calculate the handwheel torque values for each section and the motor current values for each section.

Figure 6:
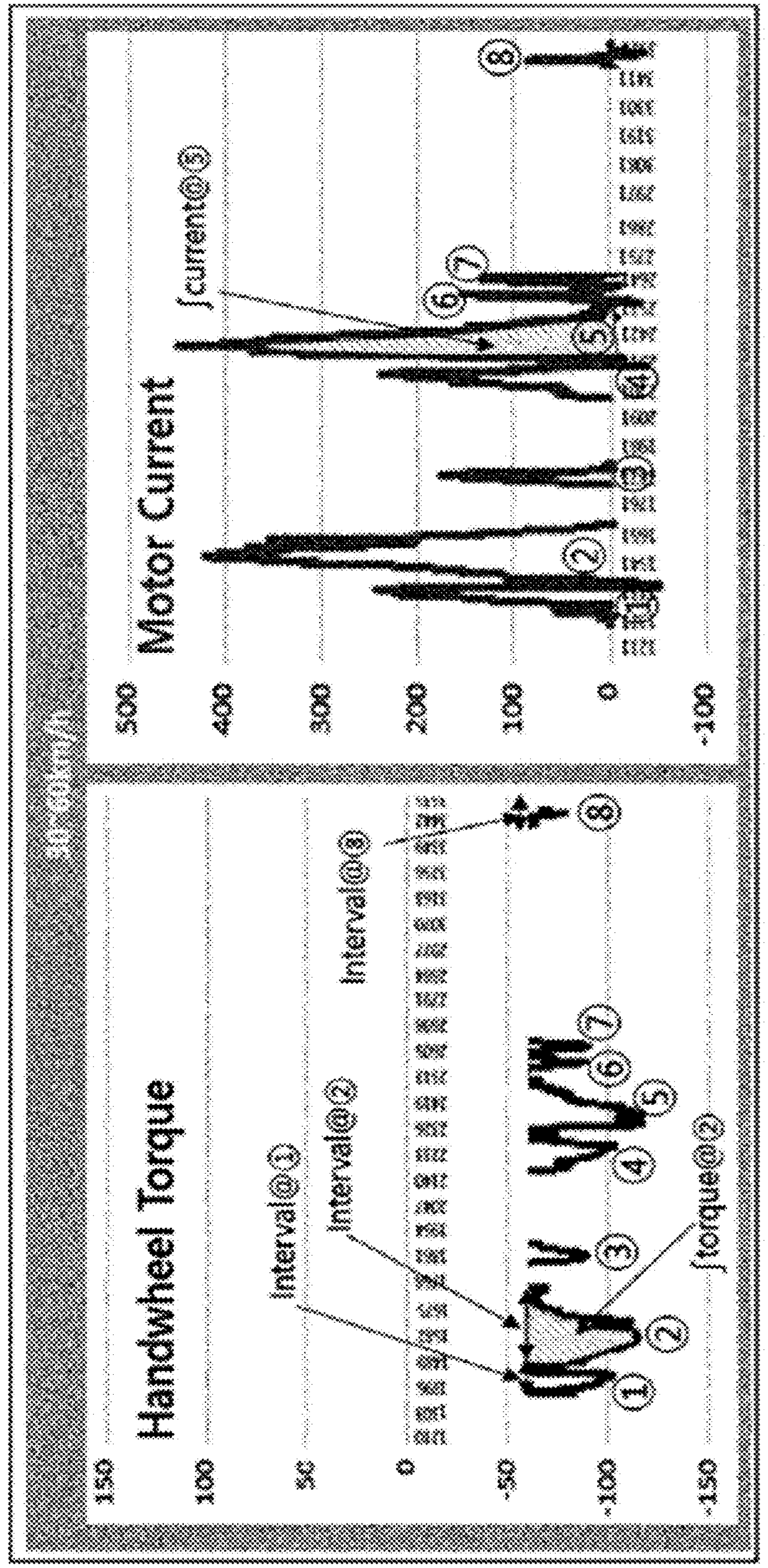
FIG. 6 is a graph explaining an operation of a torque/current calculation unit of FIG. 1.

For reference, FIG. 6 is a graph explaining the operation of the torque/current calculation unit 133, and exemplifies results of calculating eight handwheel torque values for each section and eight motor current values for each section by distinguishing among a total of eight sections having valid interval lengths from ① to ⑧, through which a current flows, in a vehicle speed range of 30 to 60 km/h and performing integration operations for each of the eight sections.

As described above, when the torque/current calculation unit 133 distinguishes the valid sections in the handwheel torque signal and the motor current signal and performs an integration operation for each section to calculate the handwheel torque values for each section and the motor current values for each section, next, the current/torque ratio calculation unit 134 calculates a current-to-torque ratio which represents a ratio of the force assisted by the electric steering motor 120 to the total handwheel torque generated by the steering angle adjustment of the handwheel 111 using the handwheel torque value and motor current value calculated by the torque/current calculation unit 133.

In this case, the current/torque ratio calculation unit 134 calculates the current-to-torque ratio using an average value of the handwheel torque values for each section and an average value of the current values for each section.

After the current-to-torque ratio is calculated, the comparison unit 135 then compares the current-to-torque ratio calculated by the current/torque ratio calculation unit 134 with the tolerance ratio value of the vehicle that has been stored in advance to determine whether the vehicle load is increased or decreased, and transmits the determination result to the driving signal output control unit 136.

When an increase in the vehicle load is determined by the comparison unit 135, the driving signal output control unit 136 outputs a driving signal that increases the motor current applied to the electric steering motor 120 according to a vehicle load increase ratio.

On the other hand, when a decrease in the vehicle load is determined by the comparison unit 135, the driving signal output control unit 136 outputs a driving signal that reduces the motor current applied to the electric steering motor 120 according to the vehicle load decrease ratio.

In contrast, when the comparison unit 135 determines that there is no change in the vehicle load increase or decrease, the driving signal output control unit 136 outputs a driving signal that adjusts the motor current applied to the electric steering motor 120 to have the same motor current as immediately prior to the determination.

As can be seen from the above description, since the present invention does not use a separate vehicle load detection sensor device, it is possible to solve both the problem of having to secure a physically separate external space to install a conventional vehicle load detection sensor device when a vehicle steering device is implemented and the problem of causing a direct increase in the cost of the steering device due to the installation of the sensor device.

In particular, since the present invention outputs a driving signal for controlling the motor current applied to the electric steering motor 120 based on the detected vehicle load using the vehicle speed, the handwheel torque, and the motor current of the electric steering motor, a precise steering performance improvement effect and a motor overheating prevention effect can be expected.

The invention claimed is:

1. An electric steering device having a vehicle load detection function, comprising:

a handwheel sensor (110) configured to detect a handwheel torque according to steering angle adjustment of a handwheel (111);

an electric steering motor (120) driven by a driving signal that controls a motor current to rotate the handwheel (111); and a steering controller (130) configured to output the driving signal when the handwheel torque is detected, wherein the steering controller (130) includes:

a preprocessing unit (131) configured to receive a vehicle speed signal, a handwheel torque signal, and a motor current signal detected from the electric steering motor (120) and filter them to extract signal components;

a signal classification unit (132) configured to classify the handwheel torque signal and the motor current signal extracted by the preprocessing unit (131) to correspond to a pre-designated vehicle speed range;

a torque/current calculation unit (133) configured to calculate a handwheel torque value and a motor current value by integrating the handwheel torque signal and the motor current signal classified according to the vehicle speed range in the signal classification unit (132);

a current/torque ratio calculation unit (134) configured to calculate a current-to-torque ratio that represents a ratio of a force assisted by the electric steering motor (120) to a total handwheel torque generated by the steering angle adjustment of the handwheel (111) using the handwheel torque value and the motor current value calculated by the torque/current calculation unit (133);

a comparison unit (135) configured to compare the current-to-torque ratio calculated by the current/torque ratio calculation unit (134) with a tolerance ratio value of a corresponding vehicle that has been stored in advance to determine whether a vehicle load is increased or decreased; and a driving signal output control unit (136) configured to output a driving signal for controlling a motor current applied to the electric steering motor (120) according to whether the vehicle load is increased or decreased as obtained by the comparison unit (135).

2. The electric steering device having a vehicle load detection function of claim 1, wherein the preprocessing unit (131) receives the vehicle speed signal through vehicle controller area network (CAN) communication.

3. The electric steering device having a vehicle load detection function of claim 1, wherein the preprocessing unit (131) performs filtering to remove high-frequency noise components included in each of the vehicle speed signal, the handwheel torque signal, and the motor current signal, and thus extracts the signal components.

4. The electric steering device having a vehicle load detection function of claim 1, wherein the preprocessing unit (131) removes an average value of the motor current signal thereby extracting the signal components.

5. The electric steering device having a vehicle load detection function of claim 1, wherein the torque/current calculation unit (133) distinguishes valid sections from the handwheel torque signal and the motor current signal and performs an integration operation for each section to calculate the handwheel torque value for each section and the motor current value for each section.

6. The electric steering device having a vehicle load detection function of claim 5, wherein the current/torque ratio calculation unit (134) calculates the current-to-torque ratio using an average value of the handwheel torque values for each section and the motor current values for each section, that is, an average value of the handwheel torque values for each section and an average value of the motor current values for each section obtained by distinguishing valid sections from the handwheel torque signal and the motor current signal in the torque/current calculation unit (133) and performing an integration operation for each section.

7. The electric steering device having a vehicle load detection function of claim 1, wherein the driving signal output control unit (136) outputs a driving signal that increases the motor current applied to the electric steering motor (120) according to a vehicle load increase ratio when an increase in the vehicle load is determined by the comparison unit (135).

8. The electric steering device having a vehicle load detection function of claim 1, wherein the driving signal output control unit (136) outputs a driving signal that reduces the motor current applied to the electric steering motor (120) according to a vehicle load decrease ratio when a decrease in the vehicle load is determined by the comparison unit (135).

9. The electric steering device having a vehicle load detection function of claim 1, wherein when the comparison unit (135) determines that there is no change in an increase or decrease of the vehicle load, the driving signal output control unit (136) outputs a driving signal that adjusts the motor current applied to the electric steering motor (120) to the same motor current as immediately before the determination.

* * * * *